Jan. 17, 1928.
H. J. QUINTRELL
SWAB
Filed March 23, 1927
1,656,290
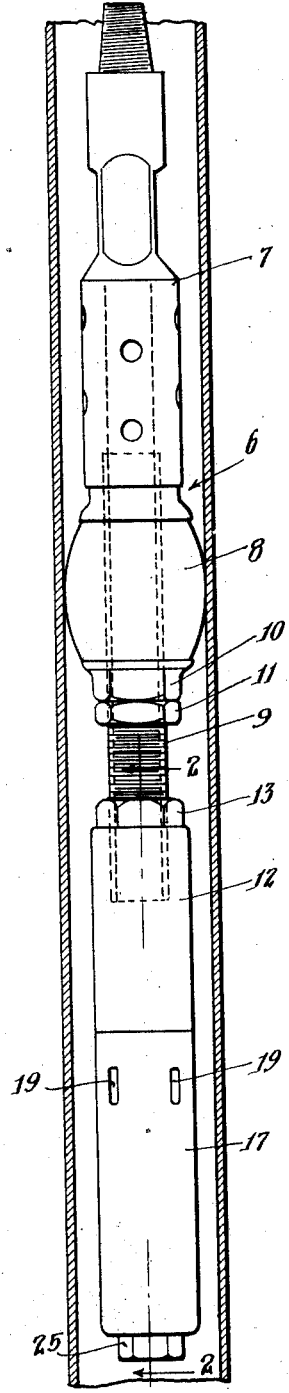
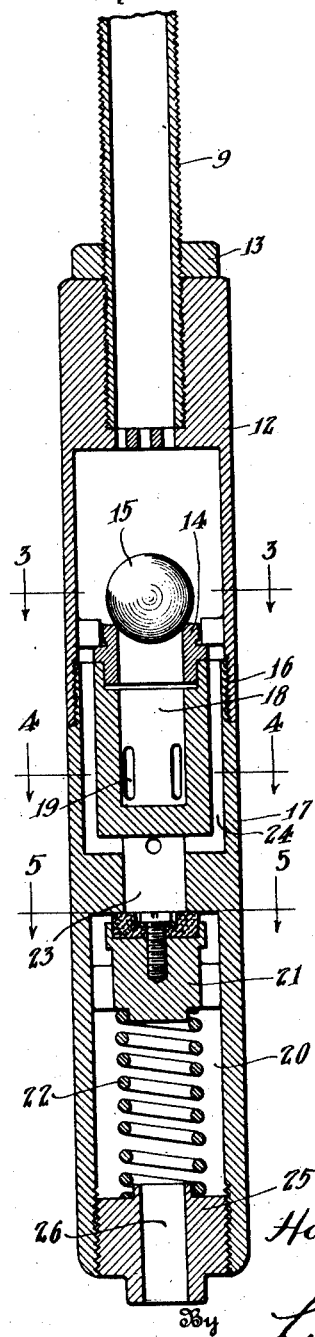
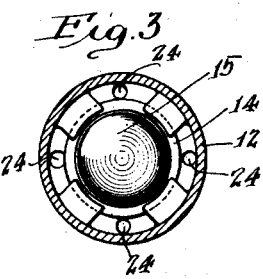
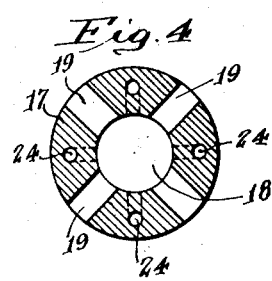
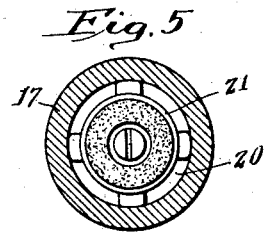
Inventor
Harry J. Quintrell
By Lyon & Lyon
Attorneys Patented Jan. 17, 1928.

1,656,290

UNITED STATES PATENT OFFICE.

HARRY J. QUINTRELL, OF SOUTHGATE, CALIFORNIA.

SWAB.

Application filed March 23, 1927. Serial No. 177,564.

This invention relates to swabs and more particularly to that type of swab constructed to permit escape of some of the liquid past the swab when the partial vacuum resulting from the swabbing operation reaches a predetermined value. The advantages of this is to avoid liability of the well casing or tubing collapsing because of the difference in pressures within and without said casing or tubing. It follows from this that one of the principal objects of the invention is to insure against collapsing of the casing or tubing when pulling a vacuum by operation of the swab.

Another object of the invention is to provide a unit embodying certain elements of the swab so that said unit can be readily attached to swabs of prior construction in order to obtain the advantages that may be derived from the use of this invention.

Still further objects are simplicity of construction and inexpensiveness of manufacture of the swab.

The accompanying drawings illustrate the invention.

Figure 1 is a longitudinal view of a swab embodying the inventon, a fragment of well casing or tubing, in which the swab is positioned, being shown in section.

Figure 2 is an enlarged fragmental section on the line indicated by 2—2, Figure 1, the well casing or tubing being omitted.

Figures 3, 4 and 5 are transverse sections on the lines indicated by 3—3, 4—4, and 5—5 respectively, Figure 2.

Referring to the drawings, a swab of well known construction is indicated in general by the character 6 and comprises a plunger 7, a rubber 8, a pipe 9, a lower flange 10 on the pipe 9 and a nut 11 screw threaded on the pipe 9 to force the flange 10 toward the plunger so as to expand the rubber 8 into close contact with the inner face of the casing or tubing. The swab also comprises a valve cage 12 screwed onto the lower end of the pipe 9, which communicates with the interior of said valve cage, a lock nut 13 on the pipe 9 to prevent unscrewing of the cage 12, a valve seat 14 within the valve cage and a ball valve 15 in the cage to close onto the seat 14. The construction and operation of swabs of the type just described are well known in this art and, accordingly it is unnecessary to describe them more in detail.

The special features of the invention, which may either be constructed as a part of the swab above described or as a separate unit that may be assembled with a swab already manufactured, will now be described.

In swabs of the type described above already manufactured, the valve seat 14 is held in place by a bushing, not shown, adapted to engage the internal screw threads 16 of the lower end of the cage 12. In lieu of said bushing I provide a chambered body 17 to engage the screw threads 16 and the valve seat 14. The body 17 is provided with an upper chamber 18 provided with ports 19 that open to the outer face of the body 17. The chamber 18 opens to the upper end of the body 17 and communicates with the bore of the valve seat 14. The body 17 is also provided with a lower valve chamber 20 in which is positioned a valve plug 21 that is urged by a spring 22 in the chamber 20 into position to close a port 23 that opens from the upper end of the chamber 20. The port 23 passes around the chamber 18 and communicates at its upper end with the interior of the cage 12. In this particular instance, the port 23 has a number of branches 24 arranged at different points around the chamber 18. The port 23 constitutes a means for by-passing liquid around the ball valve 15 so that pressure of the liquid column being raised will be imposed upon the valve 21 and the spring 22. The spring 22 will be made of a predetermined strength so that the valve 21 will open only when there is a predetermined difference between the pressures above and below the valve 21. The upper end of the spring 22 engages the valve 21 and the lower end of said spring seats against the inner face of a hollow spring seat 25, the bore of said spring seat being indicated at 26 and affording passage for liquid to and from the chamber 20. The spring seat 25 is adjustable, being screwed into the lower end of the chamber 20, thus affording a means to adjust the pressure of the spring 22 on the valve 21. The spring 22 will be adjusted to permit the valve 21 to open before the partial vacuum created below the rubber 8, during elevation of the swab, reaches a sufficient value to cause collapsing of the walls of the well casing or tubing by a great difference in pressures within and without said casing or tubing consequent upon raising of the swab.

The invention described above operates as follows: The body 17, and the parts supported thereby, having been attached to the valve cage 12, and the plunger 7 having been connected, in a manner well understood in this art, to the rods by which it is operated, the swab will be lowered through the well casing or tubing to the lower end thereof and the fluid beneath the swab will pass through the swab by entering the ports 19 to the chamber 18 and raising the ball valve 15 off of its seat.

After the swab has been lowered to the desired level, it will be elevated, thus carrying with it the column of liquid and other materials that may be in the liquid, and, since the rubber 8 closely fits the well casing or tubing, a partial vacuum will be created in the inside of the well casing or tubing below said rubber. The well casing or tubing will, of course, withstand a considerable difference in external and internal pressures, but there is a difference in pressure beyond which it is unsafe to go, for, if the partial vacuum within the casing or tubing should reach a value greater than the strength of the casing or tubing, collapsing of said casing or tubing with all its attendant evils would result. The pressure of the liquid column is imposed upon the valve 21 and, when the combined fluid pressure and spring pressure below the valve 21 becomes less than the pressure above the valve 21, said valve 21 opens and permits escape of liquid from above the valve 21 to below said valve, thus increasing the pressure below the valve 21. As soon as the combined pressures of the spring and fluid below the valve 21 are greater than the liquid pressure upon the valve 21, said valve will close. Thus as the swab travels upward in the well casing or tubing the valve 21 will open whenever the partial vacuum below the swab reaches a predetermined value, and will close when said partial vacuum has to some degree been relieved.

Though, by use of this invention, some of the liquid being raised is allowed to escape back into the well, that is preferable to collapsing the casing or tubing and, of course, the amount of liquid that thus escapes is small in comparison to the amount raised by the swab.

I claim:

1. A swab comprising a liquid-elevating means including a valve cage, a valve seat in said cage, a valve to close onto said seat, a body connected with the lower end of the cage and provided with upper and lower chambers, the upper chamber communicating with the bore of the valve seat and provided with a port opening to the outer face of said body, the lower chamber provided with a port opening past the valve to the interior of the valve cage, a valve in the lower chamber to close the second mentioned port, and a spring yieldingly holding the second mentioned valve closed.

2. The unit described comprising a body adapted for connecting with the lower end of an ordinary well swab, the body provided with upper and lower chambers, the upper chamber opening to the upper end of the body and provided with a port opening to the outer face of said body, the lower chamber provided with a port opening past the upper chamber to the upper end of the body, a valve in the lower chamber to close the second mentioned port, and a spring yieldingly holding the valve closed.

3. The unit described comprising a body provided with external screw threads at one end and provided with upper and lower chambers, the upper chamber opening to the screw threaded end of the body and provided with a port opening to the outer face of said body, the lower chamber provided with a port opening past the upper chamber to the screw threaded end of the body, a valve in the lower chamber to close the second mentioned port, and a spring yieldingly holding the valve closed.

4. The unit described comprising a body adapted for connecting with the lower end of an ordinary well swab, the body provided with a chamber opening to the upper end of the body and provided with a port opening to the outer face of said body, the body provided with a port opening past the chamber to the upper end of the body and extending downwardly beneath the chamber, a valve beneath said second mentioned port, and a spring yieldingly holding the valve in position to close the second mentioned port.

Signed at Los Angeles, this 16th day of March, 1927.

HARRY J. QUINTRELL.